United States Patent Office 3,240,715
Patented Mar. 15, 1966

3,240,715
ALKYLOLAMIDE SURFACE ACTIVE COMPOSITIONS SOLUBLE IN AQUEOUS SOLUTIONS OF ELECTROLYTES
John Thomas Foley, Chicago, Ill., assignor to Swift & Company, Chicago, Ill., a corporation of Illinois
No Drawing. Filed Dec. 8, 1960, Ser. No. 74,471
10 Claims. (Cl. 252—152)

This invention relates to surface-active compositions and more particularly to surface-active compositions which are more effective and more soluble in water in an aqueous solution of electrolytes than prior surface-active compositions of this type.

Condensation products of higher fatty acids and alkylolamines are known to possess the ability to reduce the surface tension in media containing water and the fatty acid alkylolamides are well established as satisfactory detergents, emulsifiers, wetting agents, etc. Nevertheless, these compositions possess limited solubility in water and are virtually insoluble and substantially less effective in aqueous solutions containing electrolytes. This decreased effectiveness and diminished solubility presents a particularly difficult problem where the fatty acid alkylolamide is employed in built solutions such as those containing phosphates or silicates since the alkylolamide is practically insoluble in such solutions and cannot function effectively to reduce surface tension.

It is, therefore, an object of this invention to provide a method for promoting the solubility in aqueous solutions of alkylolamide type surface-active materials.

A further object of the invention is the provision of an alkylolamide surface-active composition which is effective in aqueous solutions containing electrolytes.

Another object of the invention is the provision of a method for preparing improved alkylolamide type surface-active agents.

Additional objects, if not specifically set forth herein, will be readily apparent to those skilled in the art from the detailed description of the invention which follows.

Generally, the invention is concerned with compositions comprising condensation products of carboxylic acids and alkylolamines. The condensation products prepared from organic, higher monocarboxylic acids and higher aliphatic, dicarboxylic acids, and alkylolamines because of their ability to profoundly influence the surface tension characteristics of media containing water are useful as detergents, emulsifying agents, soil penetrants, etc. These compositions are particularly effective and useful in media not usually considered susceptible to the surface tension modifying powers of alkylolamides.

More specifically, the surface-active compositions of this invention comprise mixtures of symmetrical and unsymmetrical alkylolamides. The unsymmetrical alkylolamides are represented by higher fatty acid diethanolamides and possess the structure:

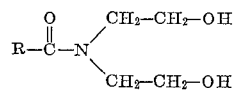

where R is selected from the group consisting of alkyl radicals having 9–21 carbon atoms and alkenyl radicals having 9–21 carbon atoms. These alkylolamides possess hydrophilic and lipophilic groups promoting both oil and water solubility. They are not very soluble in water and are virtually insoluble in aqueous solutions containing electrolytes such as salt (NaCl). Other substances which adversely affect the solubility of these alkylolamides are phosphates, silicates, etc.

The symmetrical alkylolamides represented by the formula:

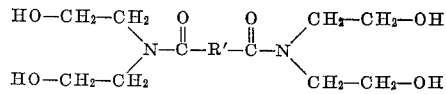

where R' is selected from the group consisting of alkylene radicals having 4–11 carbon atoms and divalent alkene radicals having 4–11 carbon atoms provide considerably less surface tension reducing powers than the unsymmetrical diethanolamides. Yet, these symmetrical diethanolamides are water-soluble even in the presence of electrolytes and appear to enhance the solubility of the unsymmetrical diethanolamides. These symmetrical diethanolamides can be employed in combination with the unsymmetrical diethanolamides so that when the mixture is added to a saturated solution of sodium chloride the salt precipitates while the mixture remains in solution.

The surface-active composition is a combination of the two types of diethanolamides and can be formulated by simply mixing the two components or the mixed diethanolamides can be formed in situ by amidating a mixture of the dicarboxylic acids and monocarboxylic acids or esters theref with diethanolamine. The amount of monocarboxylic acid diethanolamide and dicarboxylic acid diethanolamide to be employed in a given mixture depends upon the particular monocarboxylic or dicarboxylic acid employed in forming the alkylolamide and also on the particular requirements for the mixture considering the media in which it is to be employed. It should be understood that the compositions of this invention function as true detergents in fresh water or in solutions containing inorganic acids, bases or salts. The mixture appears to be soluble in all proportions in the aqueous solution, down to concentrations of about 1%. Below this level (0.1%–0.5%) some turbidity may occur.

The diethanolamide composition can be prepared by amidating a mixture of dicarboxylic acids and fatty acids with diethanolamine. The condensation reaction involves mixing and heating a fatty acid-supplying component, a dicarboxylic acid-supplying component, and diethanolamine to a temperature sufficient to form diethanolamides by splitting out water or an alcohol. It is desirable although not necessary to employ some means such as the use of an inert gas (nitrogen, carbon dioxide, etc.) or the use of vacuum to avoid oxidation in the condensation reaction. Although the failure to use nonoxidizing conditions does not adversely affect the product significantly, objectionable color bodies may be formed and the product may require additional purification, bleaching, etc. Depending upon the temperature, time, purity of reactants, etc. the final condensation product may be colored. If such color is undesirable in the particular area of use intended, various bleaching agents such as hypochlorite, hypophosphorous acid, hydrogen peroxide, sodium hydrosulfite, etc. may be employed to remove the objectionable color.

Higher fatty acids may be employed as the fatty acid-supplying component and this includes, but is not restricted to, acids such as capric acid, myristic acid, palmitic acid, stearic acid, oleic acid, linoleic acid, linolenic acid, and eleostearic acid. Also, the fatty acids derived from naturally occurring glycerides such as soybean fatty acids, cottonseed fatty acids, tallow fatty acids, linseed fatty acids, coconut oil fatty acids, safflower oil fatty acids, peanut oil fatty acids are very desirable as the source of the fatty acid component. Esters of higher fatty acids including aliphatic monohydric, dihydric, and trihydric aliphatic alcohol esters of higher fatty acids are good sources of the fatty acid component. Glyceride esters of higher fatty acids such as the naturally-occurring, animal, vegetable, and marine triglyceride esters are particularly desirable.

The dicarboxylic acids which provide the acid for the symmetrical alkylolamide can be any of the higher aliphatic, dicarboxylic acids having about 6 or more carbons. Such dicarboxylic acids as sebacic acid, azelaic acid, suberic acid, pimelic acil, adipic acid, undecane dicarboxylic acid, nonane dicarboxylic acid, and decane dicarboxylic acid are particularly satisfactory. Also, the lower aliphatic alcohol esters of these acids may be employed.

The reaction is carried out by heating and agitating the mixture of alkylolamine and fatty acid or fatty ester as well as the dicarboxylic acid or ester thereof until the condensation is substantially complete. When fatty acids arer employed as the fatty acid-supplying component the reaction mixture is one phase inasmuch as the fatty acid and alkylolamine are mutually soluble and salt formation occurs initially. Where esters of fatty acids are used the mixture is initially in two phases since the ester and alkylolamide are not miscible. As the reaction proceeds the mixture becomes clear. Completion of the reaction in the case where fatty acids are used is determined by titrating an aliquot of the reaction mixture with sodium hylroxide or other suitable alkali. When the amount of alkali required for the titration becomes constant the condensation is completed. This titration involves determination of the amount of amine soap. When the reactants are mixed initially the amine soap is formed and as the reaction proceeds this soap is broken down to form the amide. When the soap no longer breaks down to form the amide the amount of alkali used to titrate residual soap remains substantially constant. In the case where esters are employed as the fatty acid-supplying component the amine salt, of course, is not initially formed and a good measure of completion of the reaction is when the reaction mixture clarifies and becomes one phase. Usually an additional hour or so reaction time after clarification is advisable. Determination of the amount of amine soap present in the reaction mixture is used as a guide for determining completion of the reaction.

The condensation reaction, either in the case where the unsymmetrical or symmetrical materials are individually prepared or where the mixture is formed in situ, is initiated by heating a mixture of diethanolamine with the acid or mixture of acids. The reaction may be carried out at temperatures slightly below 100° C. although as with most reactions of this type a longer period is required for completion of the reaction at these lower temperatures than if higher temperatures are employed. A smooth reaction with a minimum of by-products can be carried out in a reasonable time at temperatures of about 100–150° C. although in some cases it may be possible to produce a condensate at a reaction temperature around 200° C. Where an ester is employed as the source of the fatty acid component it is possible to run the reaction at a lower temperature than could be used with the corresponding fatty acid to produce approximately the same yield. The following examples show the preparation of the surface-active composition using higher fatty acids as the fatty acid-supplying component.

*Example I*

1 mole of coconut oil fatty acids (200 grams), 2 moles of sebacic acid (404 grams), and 10 moles diethanolamine (1,050 grams) are placed in a reaction vessel. The mixture is agitated and heated under vacuum to a temperature in the range 100° C.–200° C. for a period of time varying from 1 to 18 hours. In the instant case the reaction time was about 6½ hours and the product was a clear viscous liquid. It exhibited substantial surface tension reducing properties in a saturated sodium chloride solution even in very small amounts.

*Example II*

1 mole of oleic acid, 3 moles of adipic acid, and 14 moles of diethanolamine were mixed in a reaction vessel. The mixture was agitated and heated to a temperature of 150° C. 0.5% potassium hydroxide based on total weight was added to the mixture as a catalyst. After about 5 hours reaction time the product was removed; the liquid exhibited substantial surface tension reducing properties in a hydrochloric acid water solution.

*Example III*

1 mole of tallow fatty acids (284 grams), 2 moles azelaic acid (376 grams), and 10 moles diethanolamine (1,050 grams) was placed in a reaction vessel and the reaction was carried out at a temperature of about 135° C. The reaction was substantially complete as indicated by titration of aliquots of the reaction mixture with dilute sodium hydroxide in 12 hours. The product was substantially more soluble in water than is the stearic acid condensate alone.

A low foaming detergent mixture may be prepared by embodying in the alkylolamide surface-active material a small amount of an alkylolamide salt of a higher hydroxy substituted fatty acid. The diethanolamine salts of higher fatty acids of 10–22 carbon atoms are very suitable for this purpose. Example IV shows the preparation of this type of low foaming detergent.

*Example IV*

A mixture of 329 grams of refined castor oil, 404 grams of sebacic acid, and 1,050 grams of diethanolamine is heated to a temperature of 150° under a vacuum of 26″. The mixture is agitated and maintained at the reaction temperature for 5 hours at which time the mixture which initially was an emulsion has clarified. After the 5 hours reaction time the product is cooled to 80° C. and an amount of castor oil fatty acids equal to from 20–30% of the final volume is added. With the excess of amine present in the mixture this fatty acid portion is converted into the alkylolamine salt of the fatty acid. The resulting product is a soluble low foaming detergent. In preparing the low foaming product the fatty acid employed in forming the salt should be an hydroxy substituted higher fatty acid having 10–22 carbon atoms. Examples of such acids are ricinoleic acid, dihydroxy stearic acid and other chain substituted hydroxy acids. The diethanolamide can as with other unsymmetrical amides of the invention contain either an hydroxy substituted fatty chain or free of hydroxyl groups. The preferred low foaming material contains an alkylolamide having an hydroxy substituent.

In preparing the mixture an excess of diethanolamine over that necessary to react with the acid or ester groups of the monocarboxylic and dicarboxylic acids is employed. An excess of amine favors amide formation and aids in maintaining fluidity in the reaction mixture. One mole of diethanolamine reacts with 1 mole of the monocarboxylic acid or ester while 1 mole of the diethanolamine is required for each carboxyl group in the dicarboxylic acid or ester. Thus, if 1 mole of the monocarboxylic acid and 1 mole of the dicarboxylic acid are employed in producing the mixture, there should be more than 3 moles diethanolamine available. And this excess may be as much as 50–150% over the required amount. The product contains some excess amine usually about 10–40% based on the total mixture. This amine can be removed and a higher activity in the composition obtained, but the degree of improvement is not commensurate with the additional cost incurred in further purification steps. Ordinarily the added cost inherent in amine removal such as by distillation, etc. is greater than the improvement realized as a result of purification.

The ratio of symmetrical to unsymmetrical alkylolamide required for best results in the mixture is variable depending upon the monocarboxylic acid and dicarboxylic acid components of the product and the use to which the product is directed. Solubility in aqueous solutions and efficiency of surface-activity depends upon the particular fatty acid, the type and quantity of dicarboxylic acid, and the amount of electrolyte in the solution in which the surface-active material is employed. While the unsymmetrical alkylolamide is usually only slightly soluble in fresh water the symmetrical amide is very soluble therein and also improves the solubility of the unsymmetrical amide. Very small amounts of the symmetrical amide, about 1% based on the weight of the alkylolamide mixture, may impart sufficient solubility to the unsymmetrical diethanolamide for a given use while larger amounts of the symmetrical diethanolamide, as much as about 50% based on the weight of the total alkylolamide mixture may be required in other instances. The preferred range is 50% to 75% of the symmetrical diethanolamide.

To demonstrate the effectiveness of a typical composition coming within the scope of the invention, in lowering surface tension in aqueous solutions various concentrations of symmetrical amide and varying concentrations of a mixture of symmetrical and unsymmetrical amides were compared insofar as the modification of surface tension properties is concerned. Two additives were prepared. Sample A is the diethanolamide of sebacic acid. Sample B is a mixture of 2 moles of the diethanolamide of sebacic acid and 1 mole of the diethanolamide of coconut oil fatty acids. Both samples contained a small amount of free diethanolamine. Each of these samples was added to water and the surface tension of the water was measured. The Du Nuoy tensiometer was employed in the test and the tests were run at room temperature. The following shows the effect of each of the samples on the surface tension of pure water:

TABLE I

| Concentration of Additive, percent | Surface Tension of Aqueous Solution Containing— | |
|---|---|---|
| | Sample A, dynes/cm. | Sample B, dynes/cm. |
| 1 | 49 | 31 |
| 0.5 | 48 | 31 |
| 0.1 | 53 | 37 |
| .01 | 58 | 32 |

Surface tension of the water without any additive is 65 dynes per centimeter.

The surface-active composition may be incorporated in a liquid detergent formulation or may be used in other operations where surface activity is an important consideration. It may be employed along with fillers, coloring agents, etc. usually without diminishing the effectiveness of the composition.

Obviously many modifications and variations of the invention as hereinbefore set forth may be made without departing from the spirit and scope thereof and, therefore, only those limitations should be imposed as are indicated in the appended claims.

I claim:

1. A method for rendering higher fatty acid-alkylolamide surface-active materials soluble in aqueous solutions containing electrolytes comprising: combining with a diethanolamide of a monocarboxylic fatty acid having 10–22 carbons at least about 1% based on the weight of the diethanolamides of a diethanolamide of an aliphatic dicarboxylic acid having about 6–13 carbons.

2. A method for preparing a water-soluble low foaming detergent and rendering higher fatty acid-alkylolamide surface-active materials soluble in aqueous solutions containing electrolytes comprising: forming a mixture of the diethanolamide of a fatty acid having 10–22 carbons, the diethanolamide of an aliphatic dicarboxylic acid having about 6–13 carbons and a small amount of the diethanolamine salt of a hydroxy substituted higher fatty acid having 10–22 carbons said diethanolamide of the aliphatic dicarboxylic acid being present in an amount of at least 1% based on the total weight of the diethanolamides.

3. A method for preparing a surface-active composition possessing detergent powers in aqueous solutions of electrolytes comprising heating and reacting at a temperature of at least slightly below 100° C. until the condensation is substantially complete an excess of diethanolamine with monocarboxylic fatty acids of 10–22 carbons and dicarboxylic aliphatic acids having about 6–13 carbons whereby mixed diethanolamides of said acids, is formed.

4. A method for preparing a surface-active composition possessing detergent powers in aqueous solutions of electrolytes comprising: heating and reacting at a temperature of at least slightly below 100° C. until the condensation is substantially complete diethanolamine with aliphatic monohydride alcohol esters of monocarboxylic acids having 10–22 carbons and aliphatic alcohol esters of dicarboxylic aliphatic acids having about 6–13 carbons to form mixed diethanolamides of said acids.

5. A method for preparing a low foaming surface-active composition possessing detergent properties in aqueous solutions of electrolytes comprising: heating and reacting at a temperature of at least slightly below 100° C. until the condensation is substantially complete an excess of diethanolamine with monocarboxylic hydroxy acids of 10–22 carbons and dicarboxylic aliphatic acids having about 6–13 carbons to condense said acids with said diethanolamine and form diethanolamides, cooling said reaction mixture and adding to said reaction mixture a hydroxy fatty acid of 10–22 carbons whereby to form the diethanolamide salt of said fatty acid.

6. A detergent composition characterized by substantial solubility in aqueous solutions of electrolytes comprising: a mixture of the diethanolamides of monocarboxylic acids of 10–22 carbons and at least about 1% based on the total weight of the diethanolamides of diethanolamides of dicarboxylic acids having about 6–13 carbons.

7. An alkylolamide surface-active composition soluble in water containing electrolytes in an amount sufficient to render said alkylolamide usually insoluble therein comprising: a mixture of alkylolamides of monocarboxylic higher fatty acids of 10–22 carbons and alkylolamides of dicarboxylic aliphatic acids having about 6–13 carbon atoms, said dicarboxylic acid alkylolamides being present in an amount of about 50–75% based on the alkylolamide mixture.

8. A liquid detergent composition characterized by miscibility in aqueous solutions containing electrolytes comprising: a mixture of diethanolamides of higher fatty acids of 10–22 carbons containing hydroxy substituents, at least about 1% by weight based on the diethanolamides of diethanolamides of dicarboxylic aliphatic acids of about 6–13 carbons and diethanolamide salts of higher monocarboxylic acids of 10–22 carbons containing hydroxy substituents.

9. A surface-active composition soluble in aqueous solutions containing electrolytes comprising: a mixture of diethanolamides having the structure

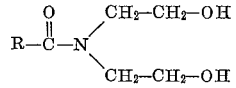

where R is selected from the group consisting of alkyl radicals having 9–21 carbons and alkenyl radicals having 9–21 carbons and diethanolamides having the structure

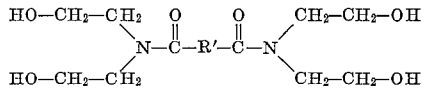

where R' is selected from the group consisting of alkylene radicals and divalent alkene radicals having 4–11 carbons, said diethanolamides represented by the second formula being present in amounts greater than 1% by weight based on the diethanolamide mixture.

10. A low foaming surface-active composition comprising: a mixture of a diethanolamide salt of hydroxy higher fatty acids, an unsymmetrical diethanolamide having the structure

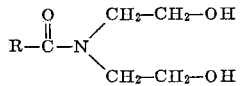

where R is selected from the group consisting of alkyl radicals having 9–21 carbons and alkenyl radicals having 9–21 carbons and at least 1% by weight based on the total weight of the diethanolamides of a symmetrical diethanolamide having the structure

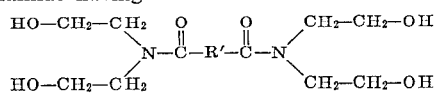

where R' is selected from the group consisting of alkylene radicals and divalent alkene radicals having 4–11 carbons.

References Cited by the Examiner
UNITED STATES PATENTS 2,094,609  10/1937  Kritchevsky _____ 252—357 XR
2,302,697  11/1942  Katzman _____ 252—357

JULIUS GREENWALD, *Primary Examiner.*